US012406614B2

(12) United States Patent
Gao et al.

(10) Patent No.: US 12,406,614 B2
(45) Date of Patent: Sep. 2, 2025

(54) IMAGE DISPLAY METHOD, DDIC CHIP, AP, DISPLAY SCREEN MODULE, AND TERMINAL

(71) Applicant: GUANGDONG OPPO MOBILE TELECOMMUNICATIONS CORP., LTD., Dongguan (CN)

(72) Inventors: Yankai Gao, Dongguan (CN); Lei Wang, Dongguan (CN); Huiyue Cai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 175 days.

(21) Appl. No.: 18/198,517

(22) Filed: May 17, 2023

(65) Prior Publication Data
US 2023/0290298 A1 Sep. 14, 2023

Related U.S. Application Data

(63) Continuation of application No. PCT/CN2021/123585, filed on Oct. 13, 2021.

(30) Foreign Application Priority Data

Nov. 17, 2020 (CN) .......................... 202011284905.8

(51) Int. Cl.
G09G 3/20 (2006.01)
G09G 3/3208 (2016.01)
(Continued)

(52) U.S. Cl.
CPC ......... G09G 3/2096 (2013.01); G09G 3/3208 (2013.01); G09G 5/006 (2013.01);
(Continued)

(58) Field of Classification Search
CPC ............... G09G 3/2096; G09G 3/3208; G09G 2320/0247; G09G 2330/021;
(Continued)

(56) References Cited

U.S. PATENT DOCUMENTS

2016/0005368 A1  1/2016 Park et al.
2017/0171450 A1  6/2017 Noh
(Continued)

FOREIGN PATENT DOCUMENTS

CN  101546537 A  9/2009
CN  106648239 A  5/2017
(Continued)

OTHER PUBLICATIONS

International Search Report and Written Opinion dated Jan. 19, 2022 in International Application No. PCT/CN2021/123585. English translation attached.
(Continued)

Primary Examiner — Adam R. Giesy
(74) Attorney, Agent, or Firm — Sheppard, Mullin, Richter & Hampton LLP

(57) ABSTRACT

Provided are an image display method, a display driver integrated circuit (DDIC) chip, an application processor (AP), a display screen module, and a terminal. The method is applied in the DDIC chip. The method includes: performing image scanning based on first image frame data issued by an AP, and performing frame compensation; stopping, in response to a compensation-stopping instruction issued by the AP, the frame compensation and waiting for the AP to issue image frame data, the compensation-stopping instruction being used to instruct the AP to prepare to issue new image frame data; and performing, in response to receiving
(Continued)

second image frame data issued by the AP, image scanning based on the second image frame data and resuming the frame compensation.

20 Claims, 11 Drawing Sheets

(51) Int. Cl.
   *G09G 5/00* (2006.01)
   *H04N 1/047* (2006.01)
   *G09G 3/3225* (2016.01)

(52) U.S. Cl.
   CPC .......... *H04N 1/047* (2013.01); *G09G 3/3225* (2013.01); *G09G 2320/0247* (2013.01); *G09G 2330/021* (2013.01); *G09G 2340/0435* (2013.01)

(58) Field of Classification Search
   CPC .......... G09G 2340/0435; G09G 5/395; G09G 2300/0861; G09G 2310/0237; G09G 3/3225; G09G 2360/18; Y02D 10/00; H04N 1/047; H04N 1/028
   See application file for complete search history.

(56) References Cited

U.S. PATENT DOCUMENTS

| | | | |
|---|---|---|---|
| 2017/0193971 A1* | 7/2017 | Bi | ............................ G09G 5/18 |
| 2017/0251170 A1 | 8/2017 | Kabuto | |
| 2020/0111418 A1 | 4/2020 | Nam et al. | |
| 2023/0030201 A1* | 2/2023 | Youn | ..................... G09G 5/006 |

FOREIGN PATENT DOCUMENTS

| | | |
|---|---|---|
| CN | 107068104 A | 8/2017 |
| CN | 107818772 A | 3/2018 |
| CN | 108519807 A | 9/2018 |
| CN | 108648704 A | 10/2018 |
| CN | 109545143 A | 3/2019 |
| CN | 109785803 A | 5/2019 |
| CN | 109817181 A | 5/2019 |
| CN | 104658491 B | 10/2019 |
| CN | 111798781 A | 10/2020 |
| CN | 112511716 A | 3/2021 |

OTHER PUBLICATIONS

First Office Action from corresponding Chinese Application No. 202011284905.8, dated Apr. 12, 2022. English translation attached.
The Second Office Action from corresponding Chinese Application No. 202011284905.8, dated Sep. 21, 2022. English translation attached.
The Grant Notice from corresponding Chinese Application No. 202011284905.8, dated Apr. 4, 2023 . English translation attached.
Extended European Search Report dated Mar. 19, 2024 received in European Patent Application No. EP21893634.2.

\* cited by examiner

IMAGE DISPLAY METHOD, DDIC CHIP, AP, DISPLAY SCREEN MODULE, AND TERMINAL

CROSS-REFERENCE TO RELATED APPLICATIONS

This application is a continuation of International Application No. PCT/CN2021/123585, filed on Oct. 13, 2021, which claims a priority to Chinese Patent Application No. 202011284905.8, filed on Nov. 17, 2020, both of which are herein incorporated by reference in their entireties.

FIELD

Embodiments of the present disclosure relate to the field of display technologies, and more particularly, to an image display method, a display driver integrated circuit (DDIC) chip, an application processor (AP), a display screen module, and a terminal.

BACKGROUND

With the constant development of display screen technologies, high-refresh-rate display screens have emerged. Also, to balance display fluency and power consumption, more and more high-refresh-rate display screens have started to support a dynamic frequency conversion.

During a dynamic frequency conversion, a DDIC chip can dynamically adjust a refresh rate of a display screen based on an image drawing speed of an AP. When an application demanding a high frame rate is run, the refresh rate of the display screen is up-regulated to improve smoothness of a picture. When an application demanding a low frame rate is run, the refresh rate of the display screen is reduced to reduce power consumption of a terminal. Moreover, to avoid picture flickering during a large-range frequency conversion, the DDIC chip performs optical compensation frame by frame after completing an image scanning.

SUMMARY

In a first aspect, the embodiments of the present disclosure provide an image display method. The method is applied in a DDIC chip of a display screen. The method includes: performing image scanning based on first image frame data issued by an AP, and performing frame compensation; stopping, in response to a compensation-stopping instruction issued by the AP, the frame compensation and waiting for the AP to issue image frame data, the compensation-stopping instruction being used to instruct the AP to prepare to issue new image frame data; and performing, in response to receiving second image frame data issued by the AP, image scanning based on the second image frame data and resuming the frame compensation.

In a second aspect, the embodiments of the present disclosure provide a DDIC chip. The DDIC chip is applied in a display screen. The DDIC chip is configured to: perform image scanning based on first image frame data issued by an AP and perform frame compensation; stop the frame compensation and wait for the AP to issue image frame data in response to a compensation-stopping instruction issued by the AP, the compensation-stopping instruction being used to instruct the AP to prepare to issue new image frame data; and perform image scanning based on second image frame data and resume the frame compensation in response to receiving the second image frame data issued by the AP.

In a third aspect, the embodiments of the present disclosure provide an AP. The AP is electrically connected to a DDIC chip of a display screen. The AP is configured to: issue first image frame data to the DDIC chip, the DDIC chip being configured to perform image scanning based on the first image frame data and perform frame compensation; issue a compensation-stopping instruction to the DDIC chip, the compensation-stopping instruction being used to instruct the AP to prepare to issue new image frame data, and the DDIC chip being further configured to stop the frame compensation and wait for the AP to issue image frame data based on the compensation-stopping instruction; and issue second image frame data to the DDIC chip, the DDIC chip being further configured to perform the image scanning based on the second image frame data and resume the frame compensation.

DETAILED DESCRIPTION

To explain the objects, technical solutions, and advantages of the present disclosure, implementations of the present disclosure will be described in detail below with reference to the accompanying drawings.

Throughout the present disclosure, the phrase "plurality" means two or more; the phrase "and/or" only represents a relationship between correlated objects, including three relationships, for example, "A and/or B" may represent three situations: A exists only, B exists only, or both A and B exist; and the character "/" generally represents an "or" relationship between the correlated objects preceding and succeeding the symbol.

Figure 1:
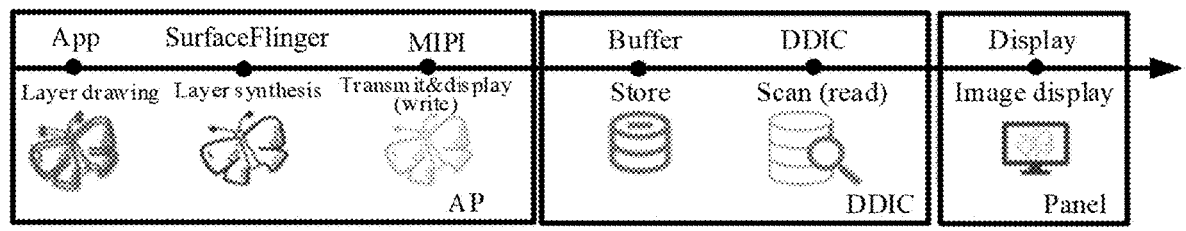
FIG. 1 is a schematic diagram of an image display process under an AP-DDCI-Panel architecture.

As illustrated in FIG. 1, under an AP-DDIC-Panel (display panel) architecture, an AP side draws and renders a layer through an application (App), and performs layer synthesis on the drawn layer through SurfaceFlinger (a layer synthesizer) to obtain image data, such that the image data is transmitted to (written in) the DDIC for display via a Mobile Industry Processor Interface (MIPI). The DDIC stores the image data transmitted by the AP for display in a buffer, and controls the Panel to perform image refresh display by scanning (reading) the image data in the buffer. When implementing an adaptive frequency conversion, the DDIC adaptively adjusts a refresh frequency based on an output frame rate of the AP (i.e., a volume of the image data delivered by the AP to the DDIC per unit time, or a speed at which the AP delivers the image data to the DDIC). For example, when the output frame rate of the AP decreases, the DDIC down-regulates the refresh rate; and when the output frame rate of the AP increases, the DDIC up-regulates the refresh rate.

A tearing effect (TE) signal is a signal generated by a DDIC chip for preventing a tearing problem, which might occur when a frame is refreshed during image display. The TE signal is generated by the DDIC chip once it is ready to refresh a next frame of image. Optionally, the AP transmits next frame of image data to the DDIC chip upon monitoring a rising edge of the TE signal or detecting that the TE signal is in a high-level state.

Emission (EM) frequency: an EM signal is a panel travel switch signal used to control whether a current row of pixels emits light. Accordingly, the EM frequency is a reporting frequency at which the EM signal is generated. Normally, the EM frequency is an integer multiple of a Gate frequency, i.e., several times of turning-on and off of EM are performed within one frame of Gate. For example, when the Gate frequency is 60 Hz, the EM frequency is 240 Hz.

In the related art, the display frequency conversion technology automatically implemented by the DDIC chip within a frequency conversion range is known as ADFR. In some embodiments, the DDIC chip implements the ADFR frame by frame. The TE signal generated by the DDIC chip is consistent with a base refresh rate (base frame rate) of a display screen. Accordingly, the AP draws an image based on a frequency of the TE signal and transmits the drawn image frame data to the DDIC chip. The DDIC chip performs image scanning (also known as image updating) based on the image frame data, and also performs frame compensation between every two adjacent image scans. The frame compensation is a process of optically compensating a display picture based on a Gamma parameter to avoid sudden changes in picture brightness during non-image scans.

Based on frequency conversion precision, the ADFR can be divided into a low-precision ADFR and a high-precision ADFR. The low-precision ADFR is performed frame by frame. The DDIC chip reports the TE signal to the AP at the base refresh rate (e.g., 120 Hz). In response to detecting the rising edge of the TE signal, the AP issues the prepared image frame data to the DDIC chip, and the DDIC chip performs the image scanning and the frame compensation. The high-precision ADFR is performed in the unit of emission cycles of the display screen (a plurality of emissions may be contained in one frame). The DDIC chip can report the TE signal to the AP at the emission frequency (an integer multiple of the base refresh rate). In response to detecting the rising edge of the TE signal, the AP issues the prepared image frame data to the DDIC chip, and the DDIC chip performs the image scanning. Since the high-precision ADFR reports the TE signal at a higher frequency than the low-precision ADFR, flexibility of a frequency conversion process can be improved, and a picture delay and lag can be reduced.

Figure 2:
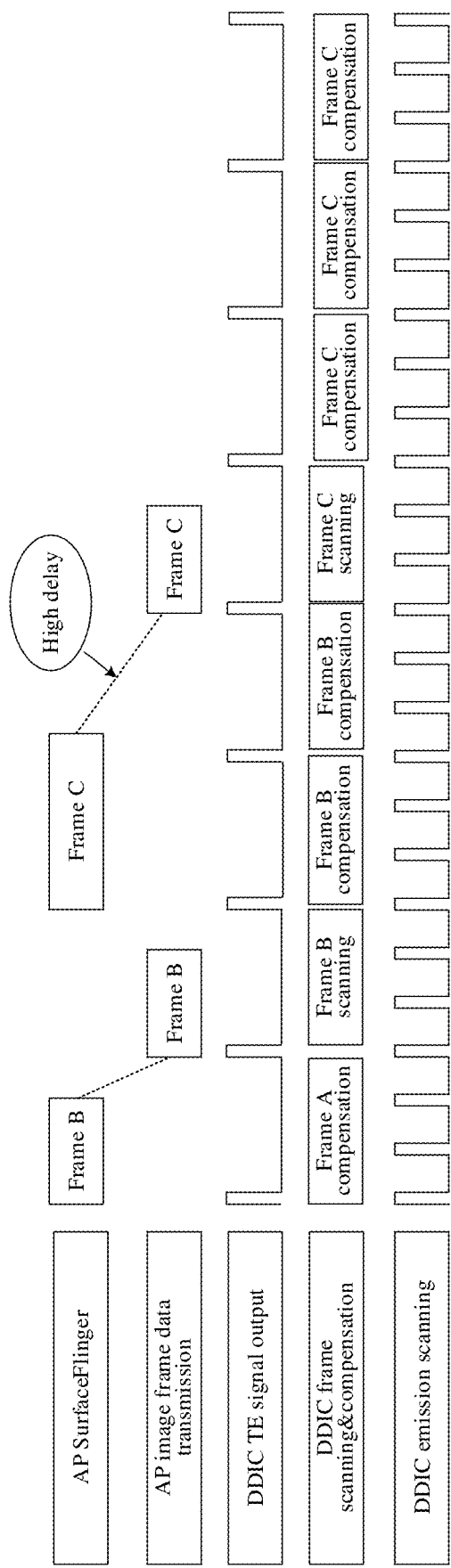
FIG. 2 is a schematic implementation diagram of a low-precision Adaptive Dynamic Frame Rate (ADFR) solution according to an exemplary embodiment of the present disclosure.

As an example, the base refresh rate of the display screen is 120 Hz, and each frame contains three emission pulses. As illustrated in FIG. 2, when a low-precision ADFR solution (120 Hz) is adopted, the DDIC chip reports the TE signal to the AP at intervals of 8.3 ms. The AP issues the image frame data to the DDIC chip when preparation of the image frame data is completed and the rising edge of the TE signal is detected. The DDIC chip performs the image scanning, and performs frame compensation frame by frame upon a completion of the image scanning.

Accordingly, in the low-precision ADFR solution, the DDIC chip needs to perform a frequency conversion frame by frame. In FIG. 2, when the AP fails to complete data preparation of frame C during the first frame compensation on frame B but completes the data preparation of frame C subsequent the beginning of the second frame compensation on frame B, image frame data of frame C is issued by the AP to the DDIC chip only after the end of the 2-nd frame compensation, resulting in a significant delay in image display of frame C.

Figure 3:
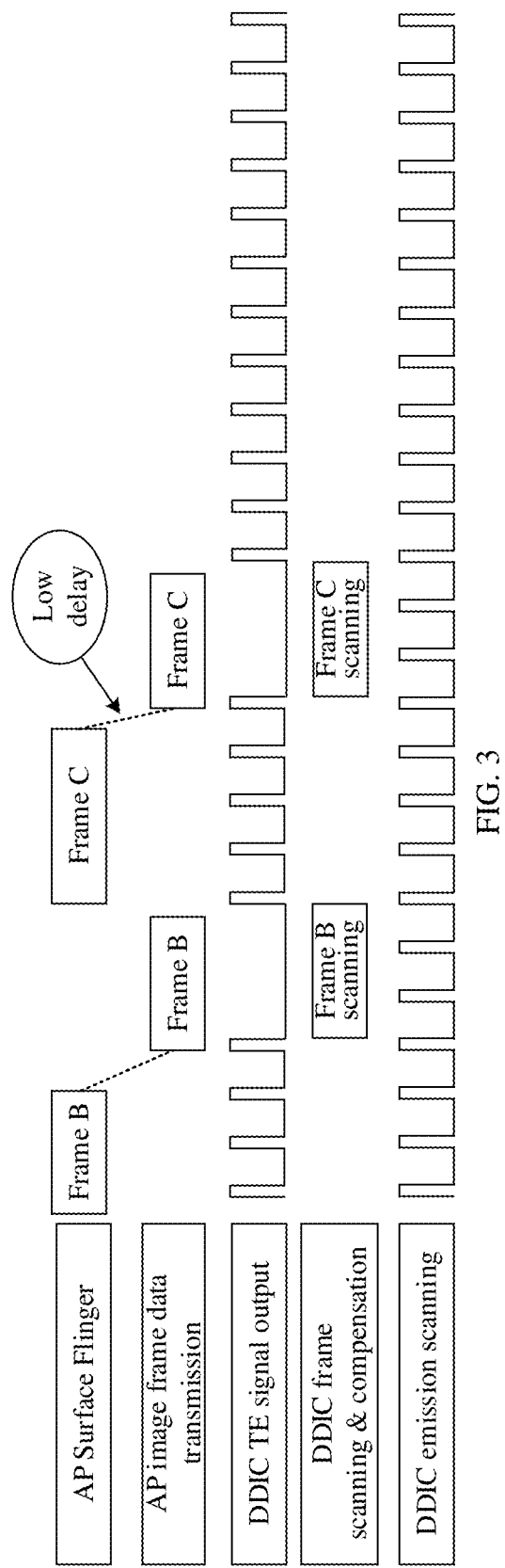
FIG. 3 is a schematic implementation diagram of a high-precision ADFR solution according to an exemplary embodiment of the present disclosure.

When the high-precision ADFR solution (360 Hz) is adopted, as illustrated in FIG. 3, the DDIC chip reports the TE signal to the AP at intervals of 2.77 ms (i.e., EM frequency). The AP issues the image frame data to the DDIC chip when preparation of the image frame data is completed and the rising edge of the TE signal is detected. The DDIC chip performs the image scanning (the TE signal is kept at a low level during the image scanning), but is unable to perform the frame compensation frame by frame after the image scanning is completed.

Accordingly, in the high-precision ADFR solution, the DDIC chip performs the frequency conversion in the unit of emission pulse. In FIG. 3, after the AP completes the data preparation of frame C, the DDIC chip reports the TE signal to the AP at a relatively high frequency, such that the AP can timely detect the rising edge of the TE signal to issue the image frame data of frame C to the DDIC chip. The DDIC chip performs the image scanning (the TE signal is kept at a low level during the image scanning), thereby shortening a delay in image display of frame C.

As can be seen from the above exemplary description, the low-precision ADFR can perform the frame compensation subsequent to the image scanning, thereby avoiding picture flickering during a large-range frequency conversion, while the high-precision ADFR cannot perform the frame compensation, which results in picture flickering during the large-range frequency conversion. However, the high-precision ADFR has a higher frequency conversion precision than the low-precision ADFR, thereby reducing the picture delay and picture lag.

Obviously, both the low-precision and high-precision ADFR solutions cannot balance a problem of picture flickering and a problem of a display delay. To solve the problems of the above-mentioned frequency conversion solutions, embodiments of the present disclosure provide a solution compatible with both low-precision frame compensation and a high-precision frequency conversion. In this solution, the AP monitors a progress of preparation of the image frame data, and when the preparation of the image frame data is about to be completed (i.e., prior to issuing the image frame data), the AP issues a compensation-stopping instruction to the DDIC chip to instruct the DDIC chip to stop frame compensation and to wait for the AP to issue new image frame data. In this way, the problem that the frame compensation results in a delay in issuing the image frame data by the AP can be avoided, and a delay in picture display can be reduced. In addition, when receiving the image frame data issued by the AP, the DDIC chip resumes the frame compensation subsequent to the image scanning, and waits for the compensation-stopping instruction subsequently issued by the AP, thereby avoiding the problem of picture flickering caused by the large-range frequency conversion With the solution provided by the embodiments of the present disclosure, the DDIC chip can perform the low-precision ADFR and the frame compensation when receiving no new image frame data, and the DDIC chip can perform the high-precision ADFR when receiving new image frame data. Therefore, the compatibility between the frame compensation and the high-precision frequency conversion can be achieved, thereby balancing the picture flickering and the display delay during the large-range frequency conversion, and a display effect of the display screen can be improved while reducing power consumption of the display screen. The exemplary embodiments are described below.

Figure 4:
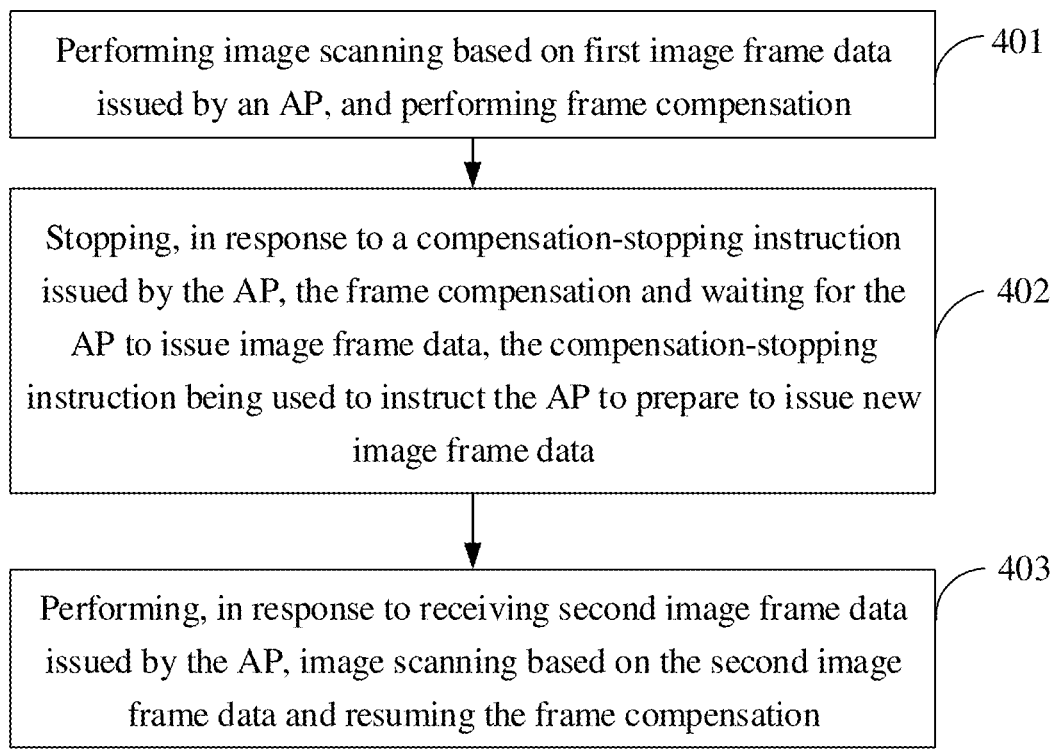
FIG. 4 illustrates a flowchart of an image display method according to an exemplary embodiment of the present disclosure.

FIG. 4 illustrates a flowchart of an image display method according to an exemplary embodiment of the present disclosure. In this embodiment, as an example, the method is applied in a DDIC chip of a display screen. Referring to FIG. 4, the method includes the following actions at block 401 to 403.

At block 401, image scanning is performed based on first image frame data issued by an AP, and frame compensation is performed.

In a possible implementation, the DDIC chip is in a low-precision ADFR mode upon receiving the first image frame data issued by the AP, and the DDIC chip performs the image scanning based on the first image frame data, and performs the frame compensation after the image scanning is completed. The DDIC chip performs the image scanning and the frame compensation on the first image frame data at a frequency corresponding to the low-precision ADFR mode.

Optionally, the DDIC chip performs optical compensation frame by frame to avoid the problem of picture flickering during the large-range frequency conversion. The embodiments of the present disclosure do not limit a specific implementation of the frame compensation.

Optionally, during the image scanning and the frame compensation, the DDIC chip reports the TE signal to the AP at a TE frequency corresponding to the low-precision ADFR.

Figure 5:
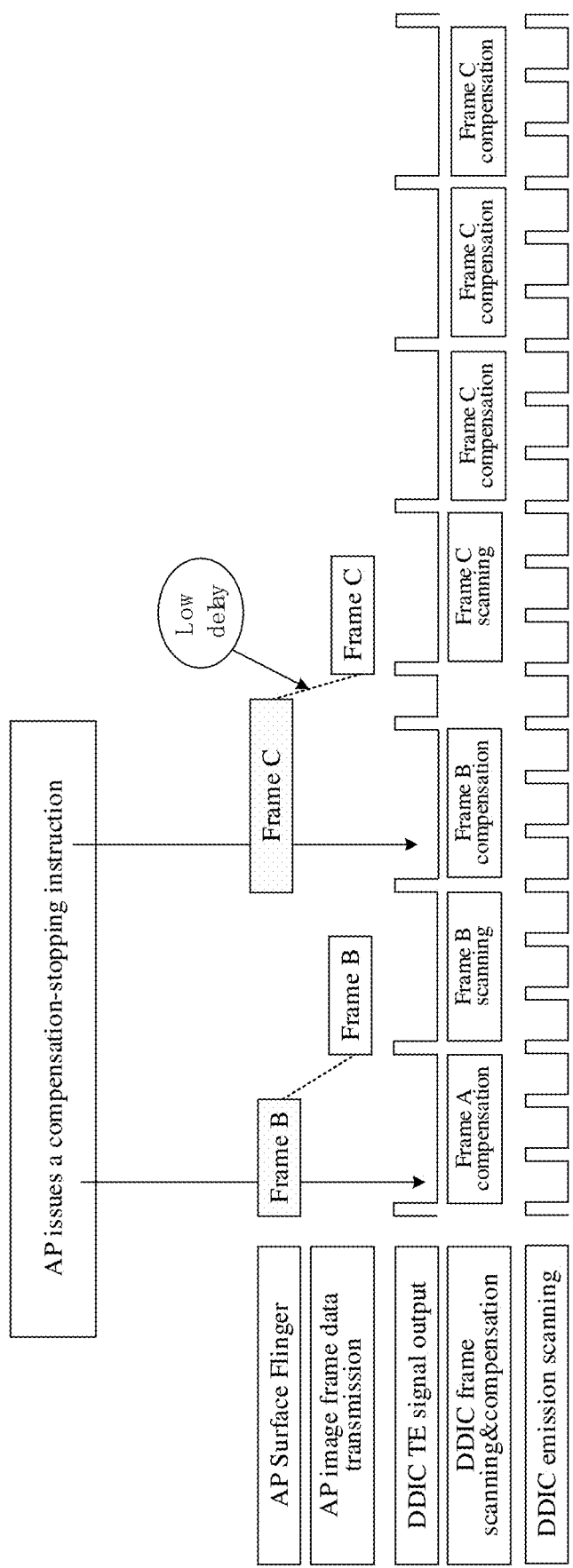
FIG. 5 illustrates a schematic diagram of an implementation process of an image display method according to an exemplary embodiment of the present disclosure.

As an example, the base refresh rate of the display screen is 120 Hz, and each frame contains three emission pulse. As illustrated in FIG. 5, the DDIC chip performs the image scanning on frame A after receiving image frame data of frame A issued by the AP, and the DDIC chip performs the frame compensation on frame A subsequent to the image scanning and when no new image frame data is received. In addition, the DDIC chip reports the TE signal to the AP at a frequency of 120 Hz and at intervals of 8.3 ms.

At block 402, in response to a compensation-stopping instruction issued by the AP, the frame compensation is stopped and the AP is waited for to issue image frame data. The compensation-stopping instruction is used to instruct the AP to prepare to issue new image frame data.

In a possible implementation, the AP monitors a progress of drawing during an image drawing, and the AP determines, when monitoring a specified drawing stage, that new image frame data is about to be issued. To avoid a significant delay in issuing the image frame data by the AP due to continued frame compensation, in this embodiment, the AP issues the compensation-stopping instruction to the DDIC chip before preparing to issue the new image frame data.

Accordingly, after the DDIC chip receives the compensation-stopping instruction, the DDIC chip stops the frame compensation and waits for the AP to issue the image frame data in a process of stopping the frame compensation.

Optionally, upon receiving the compensation-stopping instruction, the DDIC chip stops the frame compensation and enters a high-precision ADFR mode. Thus, the TE signal is reported to the AP in a TE signal reporting manner corresponding to the high-precision ADFR. When the TE signal is reported in the TE signal reporting manner corresponding to the high-precision ADFR, a delay in issuing the image frame data by the AP based on the TE signal is reduced (compared with the low-precision ADFR mode).

As illustrated in FIG. 5, when the AP prepares image frame data of frame B, the DDIC chip performs the frame compensation on frame A. When receiving the compensation-stopping instruction issued by the AP, the DDIC chip completes the current frame compensation and then stops the frame compensation and waits for the AP to issue the image frame data of frame B. Since the AP completes the preparation of the image frame data of frame B during the current frame compensation, the AP issues image data of frame B to the DDIC chip when detecting the rising edge of the TE signal, and the DDIC chip performs image scanning of frame B.

During frame compensation on frame B, the DDIC chip may receive the compensation-stopping instruction issued by the AP again, and thus, the DDIC chip stops the frame compensation after completing the current frame compensation. In a process of stopping the frame compensation, the DDIC chip adjusts the reporting frequency of the TE signal. Thus, the AP can timely issue the image frame data of frame C to the DDIC chip based on a position of the rising edge of the TE signal after the AP completes the preparation of the image frame data of frame C.

Through comparison between FIG. 2 and FIG. 5, it is apparent that after the DDIC chip stops the frame scanning based on the compensation-stopping instruction issued by the AP, the delay in issuing the image frame data subsequently by the AP can be reduced, and a time interval between image drawing and display can be shortened, thereby reducing the delay in the picture display.

At block 403, in response to receiving the second image frame data issued by the AP, image scanning is performed based on second image frame data and the frame compensation is resumed.

To avoid the problem that a failure to perform the frame compensation causes the picture flickering during the large-range frequency conversion, in the embodiments of the present disclosure, the compensation-stopping instruction issued by the AP is only valid before the image frame data is received by the DDIC chip.

When the DDIC chip receives the new image frame data issued by the AP, the DDIC chip resumes the frame compensation, i.e., returning to the low-precision ADFR mode with a frame compensation mechanism from the high-precision ADFR mode without a frame compensation mechanism.

As illustrated in FIG. 5, the DDIC chip continues to perform the frame compensation on frame B in the low-precision ADFR mode after the DDIC chip receives the image frame data of frame B issued by the AP, i.e., after the image scanning of frame B is completed; and the DDIC chip continues to perform the frame compensation on frame C in the low-precision ADFR mode after the DDIC chip receives the image frame data of frame C issued by the AP, i.e., after the image scanning of frame C is completed.

In view of the above embodiments, in the solution provided by the embodiments of the present disclosure, before preparing to issue the image frame data, the AP issues the compensation-stopping instruction to the DDIC chip based on its own progress of preparation of the image frame data, to enable the DDIC chip to stop the frame compensation based on the instruction and to be prepared for receiving the image frame data, thereby significantly reducing a delay in image display caused by the frame compensation. In addition, the delay in image display is reduced, while the frame compensation mechanism in the low-precision ADFR mode is maintained, such that the stability of picture brightness during the large-range frequency conversion can be ensured, thereby avoiding the problem of picture flickering and improving a quality of the picture display during the frequency conversion.

In summary, in the embodiments of the present disclosure, when preparing to issue new image frame data, the AP issues the compensation-stopping instruction to the DDIC chip to instruct the DDIC chip to stop the frame compensation and wait for the AP to issue the image frame data, thereby avoiding the problem that the frame compensation performed by the DDIC chip causes the delay in issuing the image frame data by the AP and a display delay. In addition, when the DDIC chip receives the image frame data issued by the AP, the frame compensation is resumed after the image scanning is performed, thereby avoiding the problem of picture flickering caused by the large-range frequency conversion.

Optionally, the action of stopping the frame compensation and waiting for the AP to issue the image frame data in response to the compensation-stopping instruction issued by the AP includes: stopping next frame compensation in response to receiving the compensation-stopping instruction issued by the AP during the frame compensation and subsequent to an end of a low level of a TE signal, in which the frame compensation is performed during the low level of the TE signal; and reporting, during said waiting for the AP to issue the image frame data, the TE signal to the AP in a predetermined manner, the predetermined manner being used to reduce a delay in issuing the image frame data by the AP.

Optionally, the TE signal is reported by the DDIC chip to the AP at a first frequency during the image scanning and the frame compensation. The action of reporting, during the action of waiting for the AP to issue the image frame data, the TE signal to the AP in the predetermined manner includes: reporting, during said waiting for the AP to issue the image frame data, the TE signal to the AP at a second frequency, the second frequency being higher than the first frequency, and the AP being configured to issue the image frame data in response to detecting a rising edge of the TE signal.

Optionally, an EM frequency of the DDIC chip is an integer multiple of the second frequency.

Optionally, the TE signal is reported by the DDIC chip to the AP at a first frequency during the image scanning and the frame compensation. The action of reporting, during said waiting for the AP to issue the image frame data, the TE signal to the AP in the predetermined manner includes: reporting, during said waiting for the AP to issue the image frame data, a sustaining high-level TE signal to the AP. The AP is configured to issue the image frame data in response to detecting a high level of the TE signal.

Optionally, the action of performing the image scanning based on the second image frame data and resuming the frame compensation in response to receiving the second image frame data issued by the AP includes: performing the image scanning based on the second image frame data and resuming the frame compensation in response to receiving the second image frame data issued by the AP within a maximum duration of the sustaining high-level TE signal. The method further includes: resuming the frame compensation in response to receiving no second image frame data issued by the AP within the maximum duration of the sustaining high-level TE signal.

Optionally, the maximum duration is a single frame duration corresponding to the first frequency.

Optionally, the display screen is an organic light-emitting diode (OLED) display screen.

Optionally, the display screen is a low temperature polycrystalline oxide (LTPO) display screen.

Optionally, the method is applied in the DDIC chip of the display screen in a mobile terminal.

Figure 6:
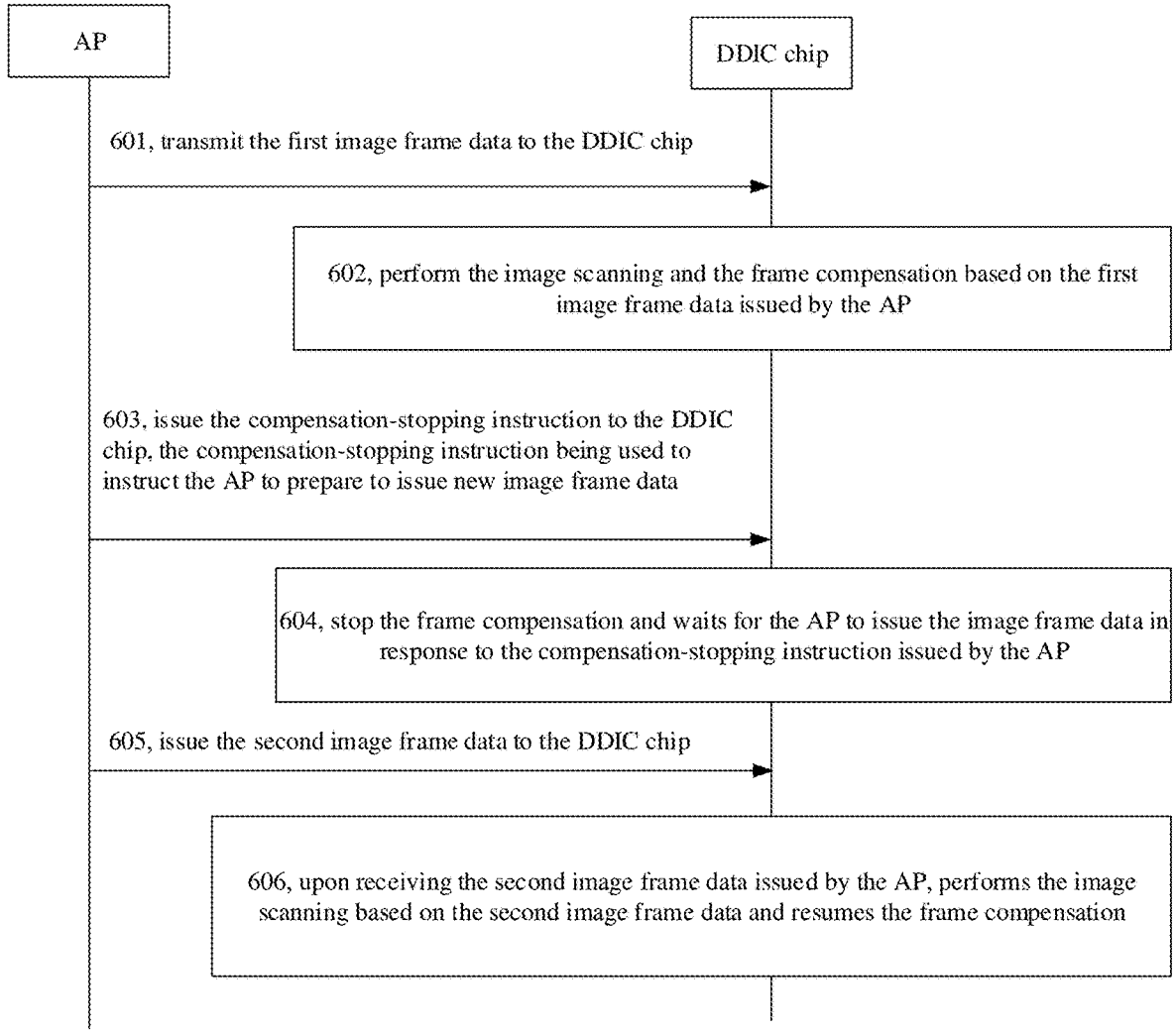
FIG. 6 is a flowchart of an interaction process between an AP and a DDIC chip according to an exemplary embodiment of the present disclosure.

In combination with the embodiment illustrated in FIG. 4, an interaction process between the DDIC chip and the AP during the image display is illustrated in FIG. 6.

At block 601, the AP issues the first image frame data to the DDIC chip.

At block 602, the DDIC chip performs the image scanning and the frame compensation based on the first image frame data issued by the AP.

At block 603, the AP issues the compensation-stopping instruction to the DDIC chip. The compensation-stopping instruction is used to instruct the AP to prepare to issue new image frame data.

At block 604, the DDIC chip stops the frame compensation and waits for the AP to issue the image frame data in response to the compensation-stopping instruction issued by the AP.

At block 605, the AP issues the second image frame data to the DDIC chip.

At block 606, when receiving the second image frame data issued by the AP, the DDIC chip performs the image scanning based on the second image frame data and resumes the frame compensation.

Regarding the timing for issuing the compensation-stopping instruction to the DDIC chip by the AP, in a possible implementation, the above action at block 603 may include the following sub-actions.

I. The compensation-stopping instruction is generated when image synthesis is performed through the layer synthesizer (SurfaceFlinger).

As a layer synthesizer, SurfaceFlinger is used to synthesize a plurality of layers (surfaces) delivered by an upper layer (application). Each surface corresponds to one window of the upper layer, such as a dialog box, a state bar, and an activity. When the AP performs the image synthesis through SurfaceFlinger, it indicates that the AP is about to complete the preparation of the image frame data. Therefore, in order to notify the DDIC chip in advance to stop the frame compensation, the AP generates the compensation-stopping instruction when performing the image synthesis through SurfaceFlinger.

II. The compensation-stopping instruction is issued to the DDIC chip when the next TE signal is at low level.

Due the presence of a time interval between issuing the compensation-stopping instruction and issuing the image frame data (i.e., it still takes a period of time before the AP issues the image frame data), in some embodiments, the AP issues the compensation-stopping instruction to the DDIC when the next TE signal is at low level. That is, the DDIC chip receives the compensation-stopping instruction during the frame compensation, and the AP prepares the image frame data during the frame compensation of the DDIC chip.

As illustrated in FIG. 5, the AP generates the compensation-stopping instruction when performing the image synthesis on frame B through SurfaceFlinger, and the AP issues the compensation-stopping instruction to the DDIC chip when the next TE signal is at low level (i.e., during the frame compensation on frame A); and the AP generates the compensation-stopping instruction when performing the image synthesis on frame C through SurfaceFlinger, and the AP issues the compensation-stopping instruction to the DDIC chip when the next TE signal is at low level (i.e., during the frame compensation on frame B).

It should be noted that, as an example, the above embodiments only describe that the AP generates and issues the compensation-stopping instruction during the image synthesis. In other possible implementations, the AP may also issue the compensation-stopping instruction at other stages in the process of the preparation of the image frame data (as long as it can be ensured that the compensation-stopping instruction is issued before the image frame data is issued). The embodiments of the present disclosure do not limit specific timing of issuing the compensation-stopping instruction.

To reduce a delay between completing the preparation of the image frame data by the AP and issuing the image frame data by the AP, the DDIC chip reports the TE signal to the AP in a predetermined manner (changing the manner that the TE signal is reported in the low-precision ADFR mode) during waiting for the AP to issue the image frame data frame, to reduce the delay in issuing the image frame data by the AP. The DDIC chip may report the TE signal to the AP by means of multiple TE or single TE during a period in which compensation is stopped. Description is made below using exemplary embodiments.

Figure 7:
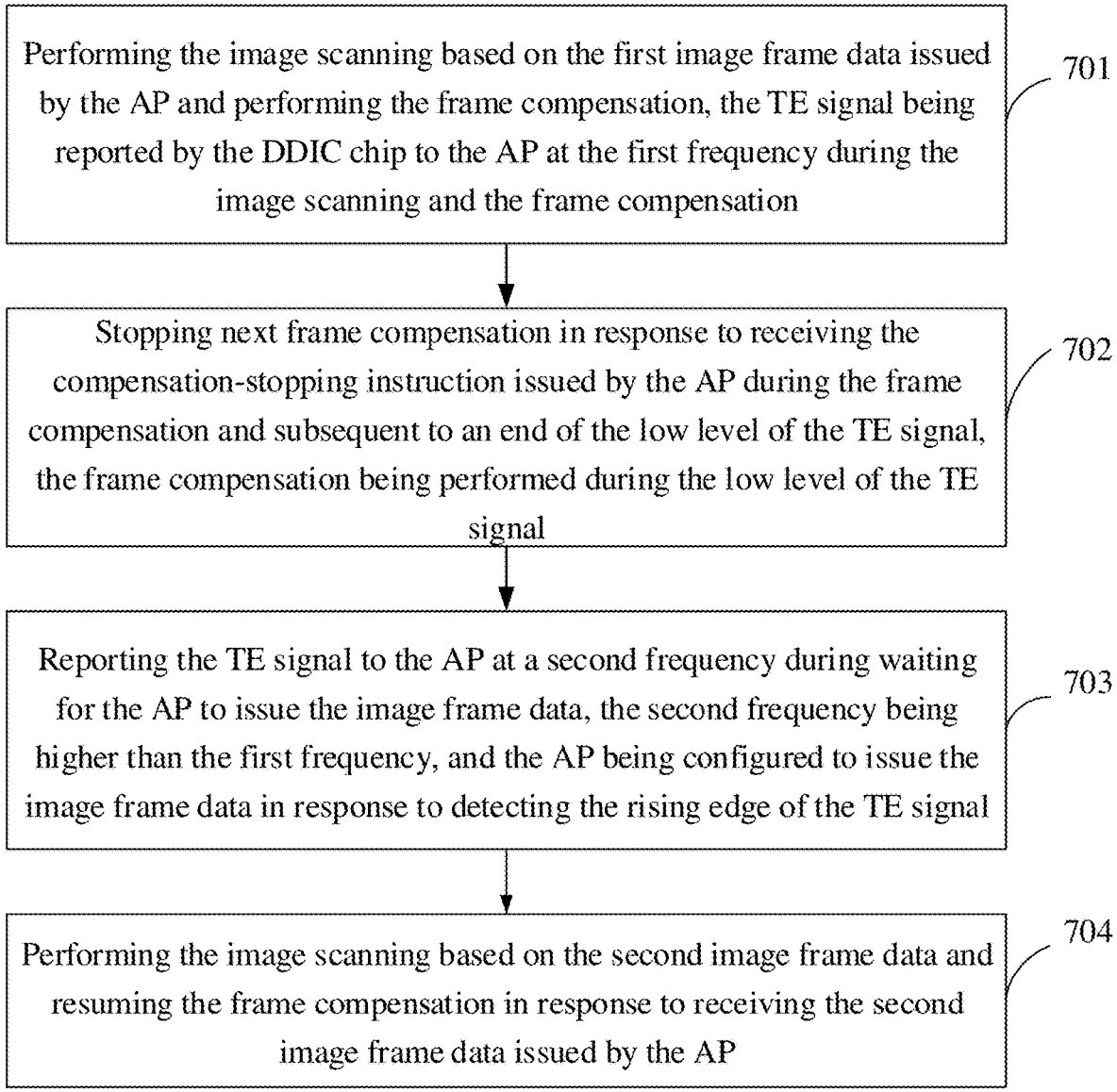
FIG. 7 illustrates a flowchart of an image display method according to another exemplary embodiment of the present disclosure.

FIG. 7 illustrates a flowchart of an image display method according to another exemplary embodiment of the present disclosure. This embodiment exemplifies that the method is applied in the DDIC chip of an OLED display screen. Referring to FIG. 7, the method includes actions at following blocks.

At block 701, the image scanning is performed based on the first image frame data issued by the AP and the frame compensation is performed. The TE signal is reported by the DDIC chip to the AP at the first frequency during the image scanning and the frame compensation.

In a possible implementation, the DDIC chip reports the TE signal to the AP at the first frequency during performing the image scanning and the frame compensation in the low-precision ADFR mode. The AP prepares and issues the image frame data based on the TE signal.

As illustrated in FIG. 5, as an example, the first frequency is 120 Hz, and the DDIC chip reports the TE signal to the AP at the frequency of 120 Hz during the image scanning and the frame compensation.

At block 702, in response to receiving the compensation-stopping instruction issued by the AP during the frame compensation and subsequent to an end of the low level of the TE signal, next frame compensation is stopped. The frame compensation is performed during the low level of the TE signal.

In a possible implementation, when the AP issues the compensation-stopping instruction when the TE signal is at low level, the DDIC chip stops the next frame compensation subsequent to the end of the low level of the TE signal. In this way, the frame compensation, which is performed by the DDIC chip when the TE signal is at low level, can be prevented from being affected.

As illustrated in FIG. 5, when receiving the compensation-stopping instruction issued by the AP during the frame compensation on frame A, the DDIC chip continues to complete current frame compensation on frame A, and stops next frame compensation on frame A subsequent to an end of a current low level of the TE signal; and when receiving the compensation-stopping instruction issued by the AP during the frame compensation on frame B, the DDIC chip continues to complete current frame compensation on frame B, and stops next frame compensation on frame B subsequent to an end of a current low level of the TE signal.

At block 703, the TE signal is reported to the AP at a second frequency during waiting for the AP to issue the image frame data. The second frequency is higher than the first frequency. The AP is configured to issue the image frame data in response to detecting the rising edge of the TE signal.

If the TE signal is still reported to the AP at the first frequency in the low-precision ADFR mode while waiting for the AP to issue the image frame data, it is likely to occur due to the relatively low reporting frequency of the TE signal that the AP has to wait for a long time to receive a next TE signal after missing one TE signal. As a result, the prepared image frame data is issued to the DDIC chip after a significant delay.

Therefore, in order to improve timeliness of issuing the image frame data by the AP, the DDIC chip reports the TE signal to the AP at the second frequency higher than the first frequency while waiting for the AP to issue the image frame data, i.e., performing a high-frequency turnover of the TE signal during a period in which the frame compensation is stopped. Since the reporting frequency of the TE signal is increased, even if the AP misses one TE signal, the AP can still receive the next TE signal in a short period of time, such that the image frame data can be issued to the DDIC chip as soon as possible, thereby shortening a time interval between completing the preparation of the image frame data and issuing the image frame data.

In a possible implementation, in order to facilitate subsequent timing sequence matching of light-emitting timing sequence and image scanning timing sequence, an EM frequency (i.e., a light-emitting and scanning frequency) of the DDIC chip is an integer multiple of the second frequency. For example, when the EM frequency of the DDIC chip is 360 Hz, the DDIC chip reports the TE signal at a frequency of 360 Hz during the period in which the frame compensation is stopped. Accordingly, the AP may issue the prepared image frame data to the DDIC chip subsequent at a delay of at most 2.77 ms.

As illustrated in FIG. 5, the DDIC chip reports the TE signal at the frequency of 360 Hz during a period in which compensation on frame A is stopped, and the DDIC chip reports one TE signal in total before receiving the image frame data of frame B; while the DDIC chip reports the TE signal at the frequency of 360 Hz during a period in which compensation on frame B is stopped, and the DDIC chip reports two TE signals in total before receiving the image frame data of frame C.

Of course, in other possible implementations, the DDIC chip may report the TE signal at another frequency (e.g., an integer multiple of the EM frequency), which is not specifically limited in the embodiments.

At block 704, in response to receiving the second image frame data issued by the AP, the image scanning is performed based on the second image frame data and the frame compensation is resumed.

Optionally, when the DDIC chip receives the second image frame data issued by the AP, the DDIC chip performs the image scanning based on the second image frame data, resumes the frame compensation subsequent to the image scanning, and re-issues the TE signal to the AP at the first frequency.

As illustrated in FIG. 5, after the DDIC chip receives the image frame data of frame C, the DDIC chip performs the image scanning on frame C, and performs the frame compensation frame by frame again after the image scanning, and resumes the reporting frequency of the TE signal to 120 Hz.

Optionally, in order to prevent the DDIC chip from waiting for a long time due to excessively early issuance of the compensation-stopping instruction by the AP, the DDIC chip resumes the frame compensation when a duration in which the TE signal is reported by the DDIC chip to the AP at the second frequency reaches a duration threshold. In this way, changes in the picture brightness, which are caused by the failure of performing the frame compensation for a long time, can be avoided, thereby improving a display quality. The duration threshold may be a single frame duration corresponding to the first frequency, which is not limited in this embodiment.

In this embodiment, the DDIC chip increase the reporting frequency of the TE signal during the period in which the frame compensation is stopped, to allow the AP to timely issue the prepared image frame data based on the high-frequency TE signal, reducing the delay in the picture display and achieving the high-precision ADFR.

Figure 8:
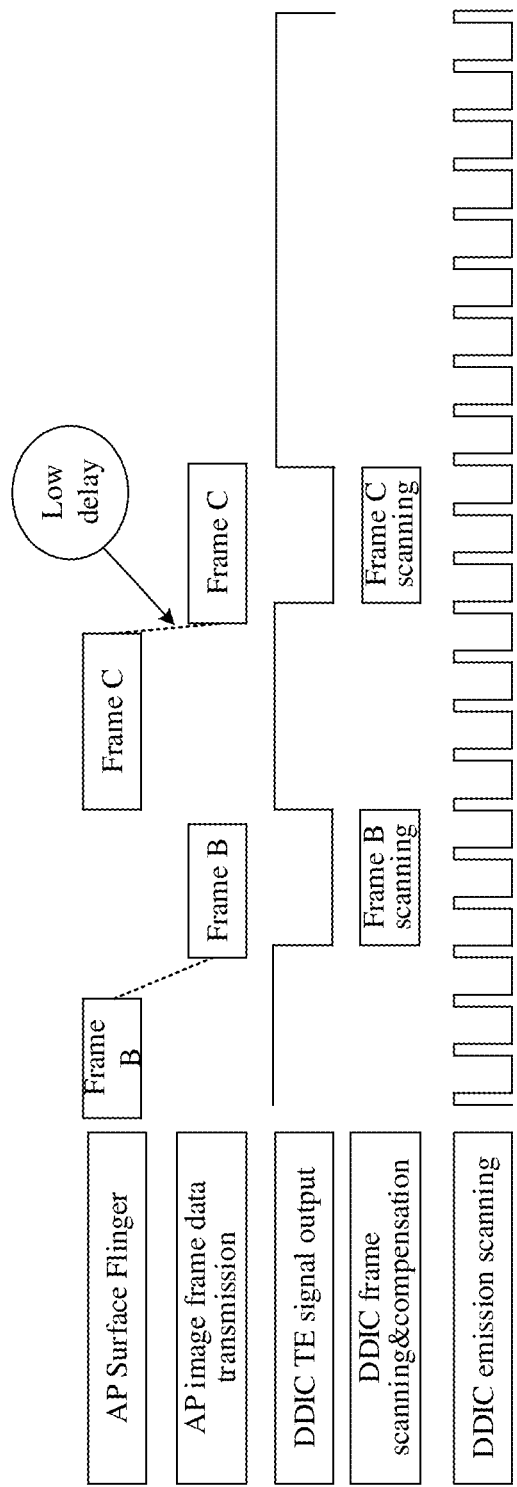
FIG. 8 is a schematic implementation diagram of a high-precision ADFR solution according to another exemplary embodiment of the present disclosure.

In another possible implementation, the DDIC chip can achieve the high-precision ADFR through the single TE. As illustrated in FIG. 8, after the DDIC chip performs the image scanning (frame B and frame C are used as examples in the figure for description), the DDIC chip reports a sustaining high-level TE signal to the AP, enabling the AP to timely issue the image frame data by detecting the high level of the TE signal. In this way, the delay in the image display can be reduced (but the frame compensation still cannot be achieved).

Figure 9:
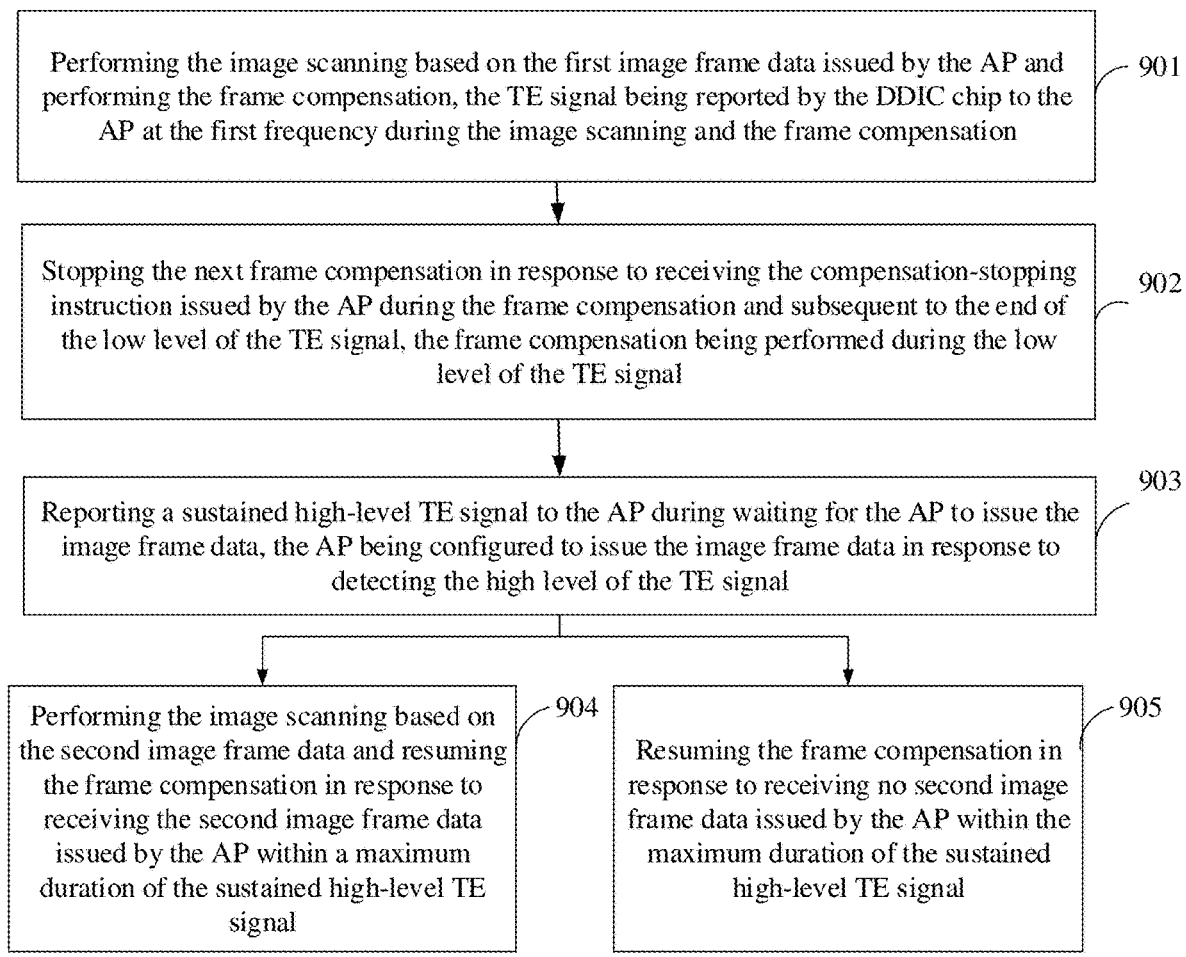
FIG. 9 illustrates a flowchart of an image display method according to yet another exemplary embodiment of the present disclosure.

FIG. 9 illustrates a flowchart of an image display method according to yet another exemplary embodiment of the present disclosure. Based on the above principle of implementing the high-precision ADFR, referring to FIG. 9, this embodiment exemplifies that the method is applied in the DDIC chip of the display screen. The method includes actions at following blocks.

At block 901, the image scanning is performed based on the first image frame data issued by the AP and the frame compensation is performed. The TE signal is reported by the DDIC chip to the AP at the first frequency during the image scanning and the frame compensation.

At block 902, in response to receiving the compensation-stopping instruction issued by the AP during the frame compensation and subsequent to the end of the low level of the TE signal, the next frame compensation is stopped. The frame compensation is performed during the low level of the TE signal.

Implementations of the actions at block 901 and block 902 can refer to the actions at block 701 and block 702, and they are not described in detail herein.

At block 903, a sustaining high-level TE signal is reported to the AP during waiting for the AP to issue the image frame data. The AP is configured to issue the image frame data in response to detecting the high level of the TE signal.

Different from the above embodiments in which a plurality of high-frequency TE signals (multiple TE) is generated during waiting for the image frame data, in this embodiment, the DDIC chip reports the sustaining high-level TE signal to the AP during waiting for the image frame data. Accordingly, the AP issues the image frame data to the DDIC chip by means of detecting the high level of the TE signal.

Optionally, in order to avoid that the preparation of the image frame data lasts for a long time due to the AP or that the DDIC chip waits for a long time due to the excessively early issuance of the compensation-stopping instruction by the AP, the sustaining high-level TE signal is set to have the maximum duration. When the image frame data issued by the AP is received within the maximum duration, the DDIC chip executes the action at block 904 of: performing the image scanning based on the second image frame data and resuming the frame compensation in response to receiving the second image frame data issued by the AP within a maximum duration of the sustaining high-level TE signal. When no image frame data issued by the AP is received within the maximum duration, the DDIC chip executes the action at block 905 of: resuming the frame compensation in response to receiving no second image frame data issued by the AP within the maximum duration of the sustaining high-level TE signal.

In a possible implementation, the maximum duration is the single frame duration corresponding to the first frequency. For example, when performing the image scanning and the frame compensation at 120 Hz, the DDIC chip reports the sustaining high-level TE signal of up to 8.3 ms during waiting for the image frame data.

The duration of the sustaining high-level TE signal may also be set by a developer as desired, which is not limited in this embodiment.

Figure 10:
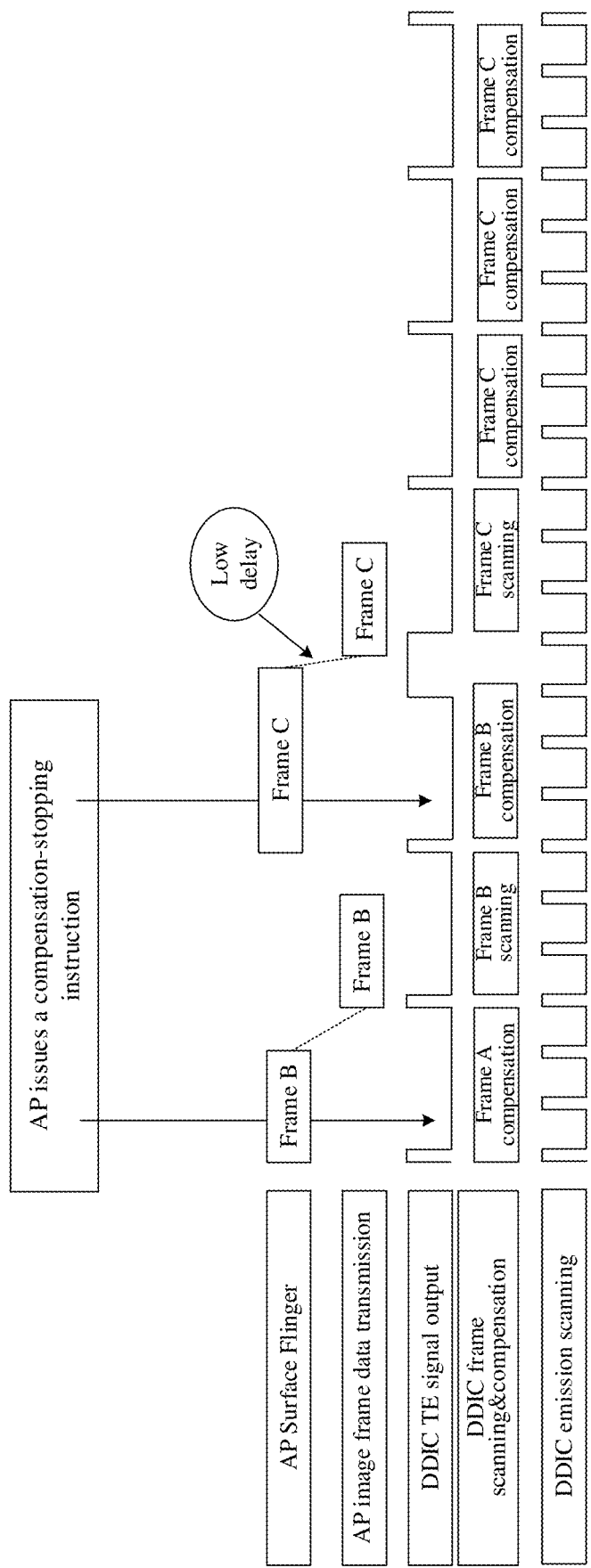
FIG. 10 illustrates a schematic diagram of an implementation process of an image display method according to another exemplary embodiment of the present disclosure.

As illustrated in FIG. 10, when receiving the compensation-stopping instruction issued by the AP during the frame compensation on frame A, the DDIC chip continues to complete the current frame compensation on frame A, and stops the next frame compensation on frame A subsequent to the end of the current frame compensation, and the DDIC chip reports the sustaining high-level TE signal to the AP. Since the AP completes the preparation of the image frame data during the frame compensation on frame A, the DDIC chip can receive the image frame data of frame B at the beginning of the sustaining high-level TE signal, such that frame B is scanned, and the frame compensation is performed on frame B at the frequency of 120 Hz.

When receiving the compensation-stopping instruction issued by the AP during the frame compensation on frame B, the DDIC chip continues to complete the current frame compensation and then stops the next frame compensation on frame B, and the DDIC chip reports the sustaining high-level TE signal to the AP. Since the AP fails to complete the preparation of the image frame data during the frame compensation on frame B, the DDIC chip can receive the image frame data of frame C issued by the AP after the sustaining high-level TE signal is reported for a period of time.

At block 904, the image scanning is performed based on the second image frame data and the frame compensation is resumed in response to receiving the second image frame data issued by the AP within a maximum duration of the sustaining high-level TE signal.

When the second image frame data issued by the AP is received within the maximum duration of the sustaining high-level TE signal, the DDIC chip stops reporting the sustaining high-level TE signal, and resumes reporting the TE signal to the AP at the first frequency, to perform the image scanning and resume the frame compensation. The DDIC chip needs to ensure that Gate sequences matches EM sequences during the image scanning.

As illustrated in FIG. 10, when the image frame data of frame C issued by the AP is received within 8.3 ms, the DDIC chip stops reporting the high-level TE signal at a next EM falling edge, performs scanning on frame C, and performs the frame compensation at the frequency of 120 Hz subsequent to the scanning of frame C.

At block 905, the frame compensation is resumed in response to receiving no second image frame data issued by the AP within the maximum duration of the sustaining high-level TE signal.

When no second image frame data issued by the AP is received within the maximum duration of the sustaining high-level TE signal, the DDIC chip resumes the frame compensation, re-reports the TE signal at the first frequency, and waits for the AP to issue new image frame data, thereby avoiding changes in the picture brightness, which may be occur when the frame compensation is stopped for a long time.

For example, when no second image frame data issued by the AP is received by the DDIC chip within 8.3 ms, the DDIC chip resumes the frame compensation and re-reports the TE signal at the frequency of 120 Hz.

In this embodiment, the DDIC chip reports the sustaining high-level TE to the AP during the period in which the frame compensation is stopped, enabling the AP to issue the prepared image frame data in time based on the high level of the TE signal. In this way, the delay in the picture display can be reduced, and the high-precision ADFR can be achieved. In addition, by setting the maximum duration of the sustaining high-level TE signal, the DDIC chip can resume the frame compensation when no image frame data is received within the maximum duration, thereby avoiding great changes in the picture brightness caused by excessively slow drawing of the AP and improving stability of the picture display during the frequency conversion.

In summary, as shown in Table I, the embodiments of the present disclosure have the following differences and advantages over the solutions known in the related art.

TABLE I

| | Low-precision ADFR solution | High-precision ADFR solution | Compatible ADFR solution (of the present disclosure) |
|---|---|---|---|
| Frequency conversion precision | Low | High | High |
| Display delay | High | Low | Low |
| Frame compensation | Adaptive | Not Adaptive | Adaptive |
| Picture flickering during large-range frequency conversion | None | Severe | None |

In some embodiments, the method provided by the embodiments of the present disclosure is applied in the mobile terminal. That is, the above-mentioned image display method is performed by the DDIC chip of the display screen in the mobile terminal. Since the mobile terminal is usually powered by a battery having limited power (which is sensitive to power consumption), the method provided by the embodiments of the present disclosure, when applied in the mobile terminal, can be compatible with the frame compensation of the low-precision ADFR and a low display delay of the high-precision ADFR, and can reduce power consumption of the mobile terminal (a dynamic frequency conversion can reduce power consumption of the display screen). The mobile terminal may include a smart phone, a tablet computer, a wearable device (such as a smart watch), a portable personal computer, etc. The embodiments of the present disclosure do not limit a specific type of mobile terminal.

The method provided by the embodiments of the present disclosure may also be applied in other non-battery-powered terminals, such as a television, a display device, or a personal computer, etc. The embodiments of the present disclosure are not limited in this regard.

In addition, in the embodiments of the present disclosure, the display screen is an LTPO display screen. Due to the specificity in the design of the LTPO display screen, the LTPO display screen flickers when subjected to the large-range frequency conversion. Thus, the solution provided in the embodiments of the present disclosure can be applied to improve the display effect of the LTPO display screen under the large-range frequency conversion.

The embodiments of the present disclosure further provide a DDIC chip. The DDIC chip is applied in the display screen. The DDIC chip is configured to: perform image scanning based on first image frame data issued by an AP, and perform frame compensation; stop the frame compensation and wait for the AP to issue image frame data in response to a compensation-stopping instruction issued by the AP, the compensation-stopping instruction being used to instruct the AP to prepare to issue new image frame data; and perform image scanning based on second image frame data and resume the frame compensation in response to receiving the second image frame data issued by the AP.

Optionally, the DDIC chip is configured to: stop next frame compensation in response to receiving the compensation-stopping instruction issued by the AP during the frame compensation and subsequent to an end of a low level of a TE signal, the frame compensation being performed during the low level of the TE signal; and report, during waiting for the AP to issue the image frame data, the TE signal to the AP in a predetermined manner, the predetermined manner being used to reduce a delay in issuing the image frame data by the AP.

Optionally, the DDIC chip is configured to report the TE signal to the AP at a first frequency during the image scanning and the frame compensation. The DDIC chip is further configured to: report, during waiting for the AP to issue the image frame data, the TE signal to the AP at a second frequency, the second frequency being higher than the first frequency, and the AP being configured to issue the image frame data in response to detecting a rising edge of the TE signal.

Optionally, an EM frequency of the DDIC chip is an integer multiple of the second frequency.

Optionally, the DDIC chip is configured to report the TE signal to the AP at a first frequency during the image scanning and the frame compensation. The DDIC chip is further configured to: report, during waiting for the AP to issue the image frame data, a sustaining high-level TE signal to the AP, the AP being configured to issue the image frame data in response to detecting a high level of the TE signal.

Optionally, the DDIC chip is configured to: perform the image scanning based on the second image frame data and resume the frame compensation in response to receiving the second image frame data issued by the AP within a maximum duration of the sustaining high-level TE signal; and resume the frame compensation in response to receiving no second image frame data issued by the AP within the maximum duration of the sustaining high-level TE signal.

Optionally, the maximum duration is a single frame duration corresponding to the first frequency.

Optionally, the DDIC chip is a DDIC chip in an OLED display screen.

Optionally, the DDIC chip is a DDIC chip in an LTPO display screen.

Optionally, the DDIC chip is a DDIC chip in the display screen in a mobile terminal.

The embodiments of the present disclosure further provide an AP. The AP is electrically connected to the DDIC chip of the display screen. The AP is configured to: issue first image frame data to the DDIC chip, the DDIC chip being configured to perform image scanning based on the first image frame data and frame compensation; issue a compensation-stopping instruction to the DDIC chip, the compensation-stopping instruction being used to instruct the AP to prepare to issue new image frame data, and the DDIC chip being configured to stop the frame compensation and wait for the AP to issue image frame data based on the compensation-stopping instruction; and issue second image frame data to the DDIC chip, the DDIC chip being configured to perform the image scanning based on the second image frame data and resume the frame compensation.

Optionally, the AP is configured to: generate the compensation-stopping instruction during image synthesis through SurfaceFlinger; and issue the compensation-stopping instruction to the DDIC chip during a next low level of a TE signal.

Reference to a detailed process of the above-mentioned DDIC chip and a detailed process of the above-mentioned AP in implementing the image display method can be made to the respective method embodiments described above, and thus details thereof will be omitted herein.

Further, the embodiments of the present disclosure provide a display screen module. The display screen module includes the display screen and the DDIC chip. The DDIC chip is configured to drive the display screen. The DDIC chip is configured to implement the image display method as provided in the respective method embodiments described above.

Figure 11:
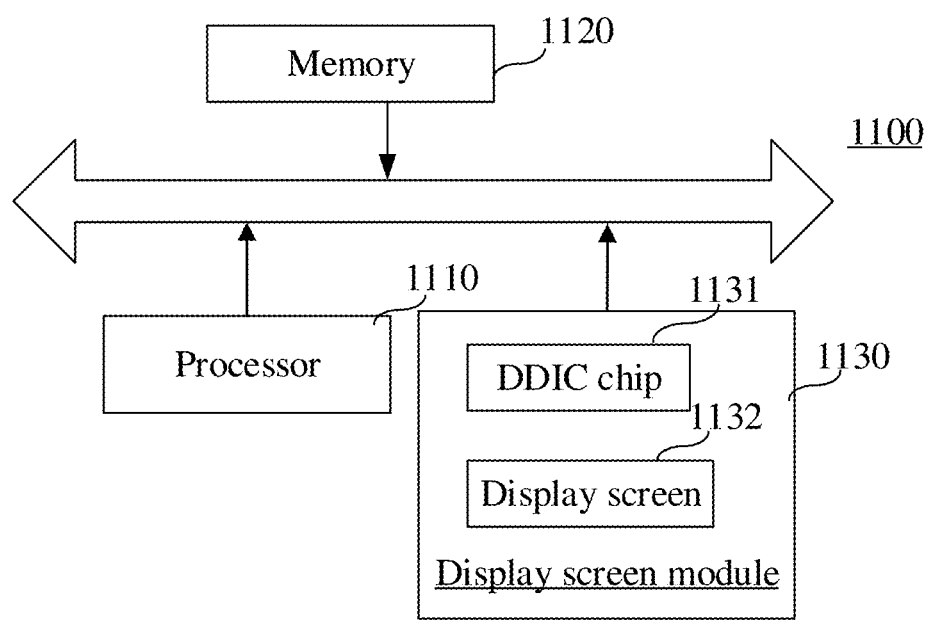
FIG. 11 illustrates a structural block diagram of a terminal according to an exemplary embodiment of the present disclosure.

FIG. 11 illustrates a structural block diagram of a terminal 1100 according to an exemplary embodiment of the present disclosure. The terminal 1100 may be a smart phone, a tablet computer, a laptop computer, etc. Referring to FIG. 11, the terminal 1100 of the present disclosure may include one or more of the following components: a processor 1110, a memory 1120, and a display screen module 1130.

The processor 1110 may include one or more processing cores. The processor 1110 connects, via various interfaces and lines, various parts within the entire terminal 1100 to perform various functions of the terminal 1100 and process data by running or executing instructions, programs, code sets, or instruction sets stored in the memory 1120, and by calling data stored in the memory 1120. Optionally, the processor 1110 may be implemented in at least one hardware form of a digital signal processing (DSP), a field-programmable gate array (FPGA), or a programmable logic array (PLA). The processor 1110 may integrate one or a combination of a central processing unit (CPU), a graphics processing unit (GPU), a neural-network processing unit (NPU), or a modem. The CPU mainly handles the operating system, user interface, applications, etc. The GPU is responsible for rendering and drawing of contents to be displayed on a touch display screen module 1130. The NPU is configured to implement an artificial intelligence (AI) function. The modem is configured to handle wireless communication. It should be understood that the above modem may be implemented by a single chip without being integrated into the processor 1110.

The memory 1120 may include a random-access memory (RAM) or a read-only memory (ROM). Optionally, the memory 1120 includes a non-transitory computer-readable storage medium (NCSM). The memory 1120 may be configured to store instructions, programs, codes, code sets, or instruction sets. The memory 1120 may include a program storage region and a data storage region. The program storage region may store instructions for implementing an operating system, instructions for at least one function (e.g., a touch function, a sound playing function, a picture playing function, etc.), instructions for implementing any of the method embodiments of the present disclosure, etc. The data storage region may store data created based on the use of the terminal 1100 (e.g., audio data or a phone book), etc.

The display screen module 1130 is a display assembly for image display, and is usually disposed on a front panel of the terminal 1100. The display screen module 1130 may be designed as a full screen, a curved screen, a specially-shaped screen, a double-sided screen, or a folding screen. The display screen module 1130 may also be designed as a combination of a full screen and a curved screen, or a combination of a specially-shaped screen and a curved screen. The embodiments are not limited to any of these examples.

In the embodiments of the present disclosure, the display screen module 1130 includes a DDIC chip 1131 and a display screen 1132 (a display panel). The display screen 1132 is an OLED display screen, which may be a low temperature poly-silicon (LTPS) AMOLED display screen or an LTPO AMOLED display screen.

The DDIC chip 1131 is configured to drive the display screen 1132 to perform image display, and is also configured to implement the image display method provided by any of the above-mentioned embodiments. In addition, the DDIC chip 1131 and the processor 1110 are connected via an MIPI interface to receive image data and instructions issued by the processor 1110.

In a possible implementation, the display screen module 1130 also has a touch function. Through the touch function, the user can use any suitable object such as a finger, a touch pen, etc., to perform touch actions on the display screen module 1130.

In addition to this, those skilled in the art can understand that the structure of the terminal 1100 illustrated in the above-mentioned figure does not constitute a limitation of the terminal 1100. The terminal 1100 may include more or fewer components than those illustrated in the figures, or combine certain components, or have a different arrangement of components. For example, the terminal 1100 further includes components such as a microphone, a speaker, a radio-frequency circuit, an input unit, a sensor, an audio circuit, a wireless fidelity (WiFi) module, a power supply, a Bluetooth module etc., which will not be described in detail here.

It is conceivable for those skilled in the art that in one or more of the above examples, functions described in the embodiments of the present disclosure may be implemented using hardware, software, firmware, or any combination thereof. When implemented using software, these functions may be stored in a computer-readable medium or transmitted as one or more instructions or codes on a computer-readable medium. The computer-readable medium includes a computer storage medium and a communication medium. The communication medium includes any medium that facilitates transmission of a computer program from one position to another. The storage medium may be any available medium that is accessible to a general purpose or specialized computer.

While the optional embodiments of the present disclosure have been described above, the present disclosure is not limited to these embodiments. Any modification, equivalent substitution, improvement, etc., made within the ideas and principles of the present disclosure shall fall within the protection scope of the present disclosure.

What is claimed is:

1. An image display method, applied in a display driver integrated circuit (DDIC) chip of a display screen, the method comprising:

performing image scanning based on first image frame data issued by an application processor (AP), and performing frame compensation;

stopping, in response to a compensation-stopping instruction issued by the AP, the frame compensation and waiting for the AP to issue image frame data, the compensation-stopping instruction being used to instruct the AP to prepare to issue new image frame data; and performing, in response to receiving second image frame data issued by the AP, image scanning based on the second image frame data and resuming the frame compensation.

2. The method according to claim 1, wherein said stopping, in response to the compensation-stopping instruction issued by the AP, the frame compensation and waiting for the AP to issue the image frame data comprises:

in response to receiving the compensation-stopping instruction issued by the AP during the frame compensation and subsequent to an end of a low level of a tearing effect (TE) signal, stopping next frame compensation, wherein the frame compensation is performed during the low level of the TE signal; and reporting, during said waiting for the AP to issue the image frame data, the TE signal to the AP in a predetermined manner, the predetermined manner being used to reduce a delay in issuing the image frame data by the AP.

3. The method according to claim 2, wherein the TE signal is reported by the DDIC chip to the AP at a first frequency during the image scanning and the frame compensation; and wherein said reporting, during said waiting for the AP to issue the image frame data, the TE signal to the AP in the predetermined manner comprises:

reporting, during said waiting for the AP to issue the image frame data, the TE signal to the AP at a second frequency, the second frequency being higher than the first frequency, and the AP being configured to issue the image frame data in response to detecting a rising edge of the TE signal.

4. The method according to claim 3, wherein an emission (EM) frequency of the DDIC chip is an integer multiple of the second frequency.

5. The method according to claim 2, wherein the TE signal is reported by the DDIC chip to the AP at a first frequency during the image scanning and the frame compensation; and wherein said reporting, during said waiting for the AP to issue the image frame data, the TE signal to the AP in the predetermined manner comprises:

reporting, during said waiting for the AP to issue the image frame data, a sustaining high-level TE signal to the AP, the AP being configured to issue the image frame data in response to detecting a high level of the TE signal.

6. The method according to claim 5, wherein said performing, in response to receiving the second image frame data issued by the AP, the image scanning based on the second image frame data and resuming the frame compensation comprises:

in response to receiving the second image frame data issued by the AP within a maximum duration of the sustaining high-level TE signal, performing the image scanning based on the second image frame data and resuming the frame compensation, and wherein the method further comprises:

in response to receiving no second image frame data issued by the AP within the maximum duration of the sustaining high-level TE signal, resuming the frame compensation.

7. The method according to claim 6, wherein the maximum duration is a single frame duration corresponding to the first frequency.

8. The method according to claim 1, wherein the display screen is an organic light-emitting diode (OLED) display screen or a low temperature polycrystalline oxide (LTPO) display screen.

9. The method according to claim 1, being applied in the DDIC chip of the display screen in a mobile terminal.

10. A display driver integrated circuit (DDIC) chip, applied in a display screen, the DDIC chip being configured to:

perform image scanning based on first image frame data issued by an application processor (AP) and perform frame compensation;

stop the frame compensation and wait for the AP to issue image frame data in response to a compensation-stopping instruction issued by the AP, the compensation-stopping instruction being used to instruct the AP to prepare to issue new image frame data; and perform image scanning based on second image frame data and resume the frame compensation in response to receiving the second image frame data issued by the AP.

11. The DDIC chip according to claim 10, being further configured to:

in response to receiving the compensation-stopping instruction issued by the AP during the frame compensation and subsequent to an end of a low level of a tearing effect (TE) signal, stop next frame compensation, wherein the frame compensation is performed during the low level of the TE signal; and report, during waiting for the AP to issue the image frame data, the TE signal to the AP in a predetermined manner, the predetermined manner being used to reduce a delay in issuing the image frame data by the AP.

12. The DDIC chip according to claim 11, being further configured to report the TE signal to the AP at a first frequency during the image scanning and the frame compensation, wherein the DDIC chip is further configured to:

report, during waiting for the AP to issue the image frame data, the TE signal to the AP at a second frequency, the second frequency being higher than the first frequency, and the AP being configured to issue the image frame data in response to detecting a rising edge of the TE signal.

13. The DDIC chip according to claim 12, wherein an emission (EM) frequency of the DDIC chip is an integer multiple of the second frequency.

14. The DDIC chip according to claim 11, being further configured to report the TE signal to the AP at a first frequency during the image scanning and the frame compensation, wherein the DDIC chip is further configured to:
  report, during waiting for the AP to issue the image frame data, a sustaining high-level TE signal to the AP, the AP being configured to issue the image frame data in response to detecting a high level of the TE signal.

15. The DDIC chip according to claim 14, being further configured to:
  in response to receiving second image frame data issued by the AP within a maximum duration of the sustaining high-level TE signal, perform the image scanning based on the second image frame data and resume the frame compensation; and
  in response to receiving no second image frame data issued by the AP within the maximum duration of the sustaining high-level TE signal, resume the frame compensation.

16. The DDIC chip according to claim 15, wherein the maximum duration is a single frame duration corresponding to the first frequency.

17. The DDIC chip according to claim 10, being a DDIC chip in an organic light emitting diode (OLED) display screen or a low temperature polycrystalline oxide (LTPO) display screen.

18. The DDIC chip according to claim 10, being a DDIC chip in the display screen in a mobile terminal.

19. An application processor (AP), electrically connected to a display driver integrated circuit (DDIC) chip of a display screen, the AP being configured to:
  issue first image frame data to the DDIC chip, the DDIC chip being configured to perform image scanning based on the first image frame data and perform frame compensation;
  issue a compensation-stopping instruction to the DDIC chip, the compensation-stopping instruction being used to instruct the AP to prepare to issue new image frame data, and the DDIC chip being further configured to stop the frame compensation and wait for the AP to issue image frame data based on the compensation-stopping instruction; and
  issue second image frame data to the DDIC chip, the DDIC chip being further configured to perform the image scanning based on the second image frame data and resume the frame compensation.

20. The AP according to claim 19, being further configured to:
  generate the compensation-stopping instruction during image synthesis through a layer synthesizer; and
  issue the compensation-stopping instruction to the DDIC chip during a next low level of a tearing effect (TE) signal.

* * * * *